United States Patent [19]

Sopora

[11] 4,089,262

[45] May 16, 1978

[54] APPARATUS FOR PRINTING DATA ON STRUCTURAL COMPONENTS

[76] Inventor: Joachim Sopora, Weidenpescher Str. 27, 5 Cologne 60, Germany

[21] Appl. No.: 720,362

[22] Filed: Sep. 3, 1976

Related U.S. Application Data

[63] Continuation of Ser. No. 575,232, May 7, 1975, abandoned.

[30] Foreign Application Priority Data

May 14, 1974 Germany ............................ 2423424

[51] Int. Cl.$^2$ ............................................ G01D 15/02

[52] U.S. Cl. .......................................... 101/4; 101/35; 346/29

[58] Field of Search ...................... 197/6.7, 49, 55, 52, 197/6.4; 101/3, 4, 93.15, 93.16, 93.17, 35; 346/141, 29; 33/18, 1; 178/6.6 B

[56] References Cited

U.S. PATENT DOCUMENTS

| | | | |
|---|---|---|---|
| 2,427,358 | 9/1947 | Kovach | 101/3 |
| 2,902,132 | 9/1959 | Walker | 197/52 |
| 3,054,494 | 9/1962 | Rizzetti | 197/6.4 |
| 3,109,059 | 10/1963 | Kargl | 178/6.6 B |
| 3,291,041 | 12/1966 | Burchfield et al. | 101/93.17 |
| 3,340,541 | 9/1967 | Klassen et al. | 346/140 |
| 3,449,754 | 6/1969 | Stutz | 346/29 |
| 3,478,680 | 11/1969 | Anderson, Jr. | 101/32 |
| 3,543,279 | 11/1970 | Rempel et al. | 346/111 |
| 3,608,692 | 9/1971 | Henry | 197/18 X |
| 3,867,882 | 2/1975 | Ahlgren et al. | 101/35 |

OTHER PUBLICATIONS

Random Braille Printer, Loeber, IBM Tech. Discl. Bull. vol. 11, No. 12, May 1969, p. 1649.

*Primary Examiner*—Russell R. Kinsey
*Assistant Examiner*—Paul J. Hirsch
*Attorney, Agent, or Firm*—Diller, Brown, Ramik & Wight

[57] ABSTRACT

This disclosure relates to a machine for applying characters to a structural component, such as an automotive chassis, engine block, or the like, and includes first and second means for moving marking means along first and second paths substantially normal to each other, means for vibrating the marking means along a third path substantially normal to the first and second paths, and control means for selectively energizing and deenergizing the first and second moving means as well as the vibrating means for selectively marking a structural component during movement of the marking means along the first and second paths.

12 Claims, 2 Drawing Figures

APPARATUS FOR PRINTING DATA ON STRUCTURAL COMPONENTS

This is a continuation of application Ser. No. 575,232, filed May 7, 1975, now abandoned.

The present invention is directed to a method of and apparatus for printing data on structural components, such as the chassis, engine block or the like of an automotive vehicle.

In the construction of motor vehicles it is necessary to provide the body with a chassis number and the engine with an engine number which numbers normally provide information in code form concerning the particular automotive component (car, truck, bus, etc.) under consideration. In order to apply the relevant data to the structural components in as permanent manner as possible it is the practice at present to provide a data carrier, such as a reference card or punch card with symbols, letters, numberals and the like which are manually set-up in a punch and then manually stamped upon the engine block or chassis. Obviously, this manner of operation has serious drawbacks primarily because the manual selection always involves the risk of human error and by manual stamping the resulting impression is frequently irregular, possibly with deformation (bending) of the chassis or body metal).

In order to mitigate such disadvantages it is also the practice to manually select a group of characters from a data carrier, insert these in a roll punch, and utilize the roll punch to stamp the component by conventional roll process. In this case it is necessary to provide an under-support or back-up for the surface to be stamped in order to produce an accepted quality of inscription without risk of deforming the body metal. However, it is not possible to eliminate in keeping with this practice the frequent cases of human error.

In keeping with the foregoing it is a primary object of this invention to provide a method in which the human selection error is completely eliminated and a uniformed imprint is obtained without the necessity of providing under-supports or back-up supports for the structural component.

In accordance with the present invention there is provided a method of marking or printing structural components by moving a marking element along a first path relative to a structural component adapted to be marked thereby, moving the marking element along a second path relative to the structural component with the latter two paths being substantially normal to each other, and selectively controllably vibrating the marking element along a third path substantially normal to the first and second paths during the movement of the vibrating element along the first and second paths thereby marking the structural component due to the vibratory energy imparted to the marking element.

By the foregoing method it is possible to obtain fully automatic imprinting or marking upon structural components of characters, such as letters, numberals, and other symbols. Heretofore, particularly in the case of series production of motor vehicles and like machines which are required to carry commission numbers or the like, it frequently occurs that the characters are inaccurately set-up and/or applied. This obviously leads to later serious difficulties, especially in the case of motor vehicles where the relevant reference numerals require correspondence to numerals entered upon ownership, transfer, and like vehicle documents. When discrepancies occur between the number carried on the automotive chassis or engine block and that on the vehicle documents this causes difficulties not only for the owner of the vehicle but also for the authority responsible for its registration. However, in accordance with the method of the present invention such not uncommon difficulties are almost completely obviated. For example, the particulars of a given vehicle can be fed by data-input apparatus into a computer which is programmed to produce therefrom the engine number and chassis number. The computer will control one or more percussion or vibratory or marking machines connected thereto so that the correct sequence of characters is imprinted or marked upon the relevant component. Misreading of characters, transposition of numerals and other errors arising in the manual application of identification data is thus eliminated.

The machine constructed in accordance with this invention for marking characters upon a structural component includes an open-ended housing displaceable by a guide system including controllable electric motors which move a vibratory marking mechanism along two mutually normal or perpendicular axis with the marking tool including a vibrating or percussion pin which vibrates at a preselected and constant speed along a third axis which is approximately at right angles to the first-mentioned axis. By selectively controlling the motion and vibration of the tool desired characters such as numbers, letters, and the like can be applied to a particular component.

The machine as described is placed upon the component to be printed such that the tip of the vibratory element lies directly above or in contact with the surface to be imprinted. The vibratory or percussion pin is then set in operation and at the same time motion along the first two-mentioned paths is controlled so that the tip follows the contours of the characters to be printed with the control being derived directly from punch cards or the like thus eliminating conventional human transposition from documents to punches.

The machine constructed in accordance with this invention produces an envariably high quality of inscription and the chassis or vehicle body is not dented or another way damaged when the tool is applied (even to enamel surfaces), and the printing operation is smooth and free from stress.

Preferably the marking or percussion machine is pneumatically driven and the housing is provided with suction means connected to a vacuum source for securing the housing to a desired component which is to be marked.

Another major object of this invention is that almost any type of character can be reproduced since individual letter, numeral or like punches are not required. The percussion or vibration tip in a sense "writes" that which is fed into its guidance system and this also produces impressions of uniformed depth which are difficult to alter which is not at all the case in straightforward conventional manual punching machines. However, since the indentations formed by the vibratory tip follow each other closely but quite separately no under-support or back-up is necessary for the structural component, particularly if the latter is the relatively thin sheet metal of a motor vehicle chassis.

It has also been found in keeping with this invention that vehicle engine blocks no longer need be milled, as is presently the case, since the imprint produced by the vibrating tip on the skin of the cast engine block is perfectly legible. This obviously reduces costs since the preparatory milling operation conventionally now followed in the industry is eliminated.

With the above and other objects in view that will hereinafter appear, the nature of the invention will be more clearly understood by reference to the following detailed description, the appended claims subject matter, and the several views illustrated in the accompanying drawings.

Figure 1:
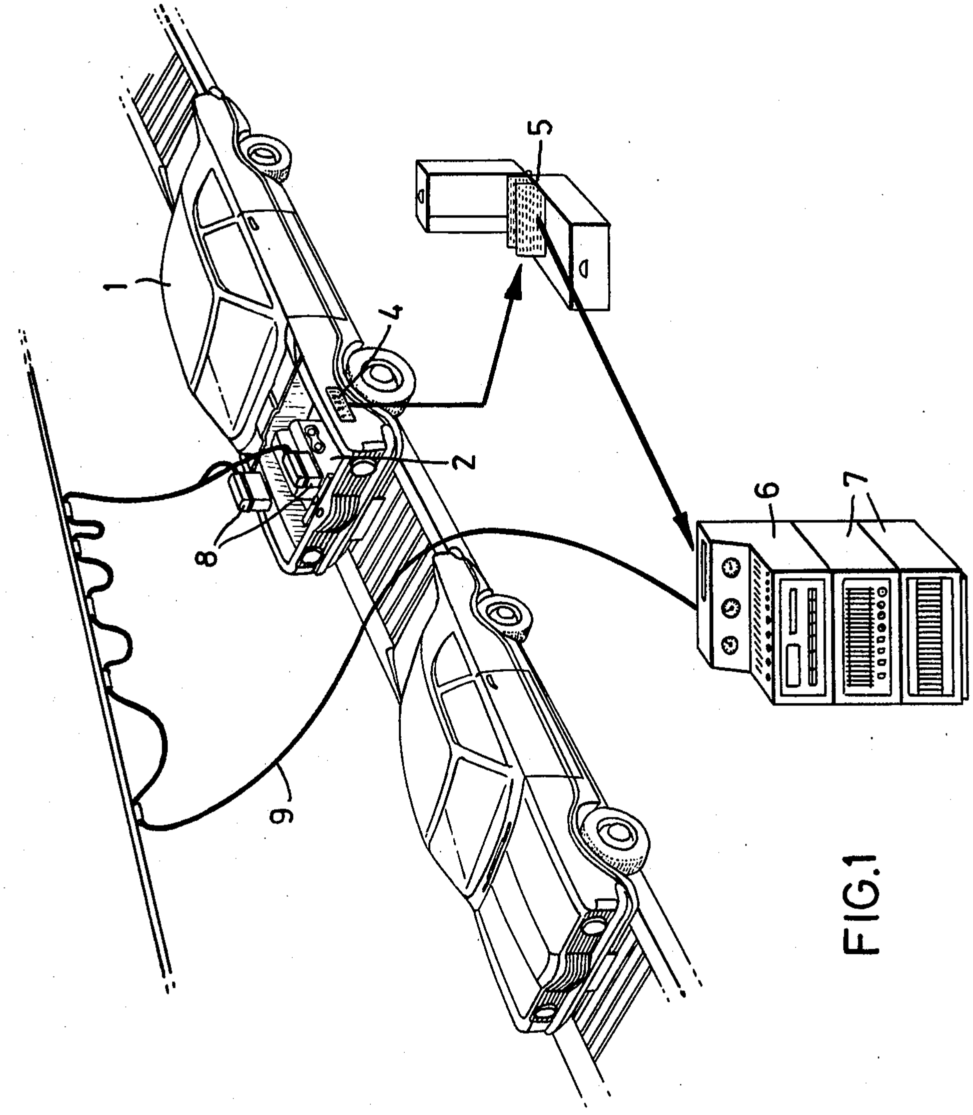
FIG. 1 is a perspective view of a marking system of this invention, and illustrates the manner in which data from punch cards or the like are read out, fed to a computer, and the latter controls a marking machine for marking the chassis and/or engine block of a motor vehicle.

Reference is first made to FIG. 1 of the drawings which illustrate the sequence of operations in accordance with the method of the present invention. A structural component which in the preferred embodiment of this invention is a motor vehicle body 1 having an internal combustion engine 2 is suitably conveyed along a production line. It is, of course, understood that the body 1 and the engine 2 is required to carry at specified points of the surface indentification particulars 3 usually in the form of a series of numbers, letters, or like characters. Such nomenclature is generally required by law and might include the engine number, the chassis number, the model number, and other indicia. The data which is to be imprinted upon the engine block or vehicle body is normally carried by, for example, a punch card 5 inserted in an envelope 4 or similar data carrier which is attached to the body 1 or simply provided at a convenient location for the desired use. The particulars which are to be imprinted upon the vehicle in question already appear on the punch card in a form which can be mechanically and/or electrically read-out by conventional card readers or the like. Thus, in keeping with this invention the punch card 5 is simply inserted into a punch card reader 6 which transfers the information to a computer 7. The card reader 6 may be, for example, the type CM8-F or CR8-F card reader manufactured by Digital Equipment Corporation of Maynard, Mass. The computer 7 in turn processes this information and transfers the same to a percussion or marking or printing machine 8 via an electrical conductor 9. The computor 7 may be, for example, the PDP-8/A miniprocessor computor manufactured by Digital Equipment Corporation of Maynard, Mass. The marking machine 8 (FIG. 2) includes a housing 10 and a resilient frame 11 which is placed upon the appropriate surface of the structural component (1 or 2) which is to be marked. With the housing 10 appropriately positioned as desired a button 12 is depressed whereupon suction cups or chambers 13 about the periphery of the resilient frame 11 are placed under negative pressure or vacuum so that the housing 10 is held securely by atmosphere pressure to the surface of the component (1 or 2).

It is, of course, possible to employ two persussion machines 8 at the same time, one for the body 1 and one for the engine 2 so that it is possible to apply both series of characters simultaneously with both being controlled by the computer 7.

The percussion machine 8 (FIG. 2) includes within the housing 10 a percussion or vibrating tool 19 clamped to a horizontal limb or arm (unnumbered) of an L-shaped bracket 22 which in turn has a vertical limb (also unnumbered) terminating at an upwardly opening U-shaped slide or biforcated portion 23. An internally threaded bore (unnumbered) passes through the bracket 22 at the juncture of the vertical and horizontal arms and threadedly engages a worm spindle 24 which is rotatably journaled in opposite end walls (unnumbered) of the housing 10. The spindle 24 is rotated by way of an electric motor 17 through appropriate shafts and gearing including a worm drive 25 when the worm spindle 24 rotates the percussion tool 19 and its vibratory tip or end 20 are displaced along the X-axis indicated in FIG. 2.

Figure 2:
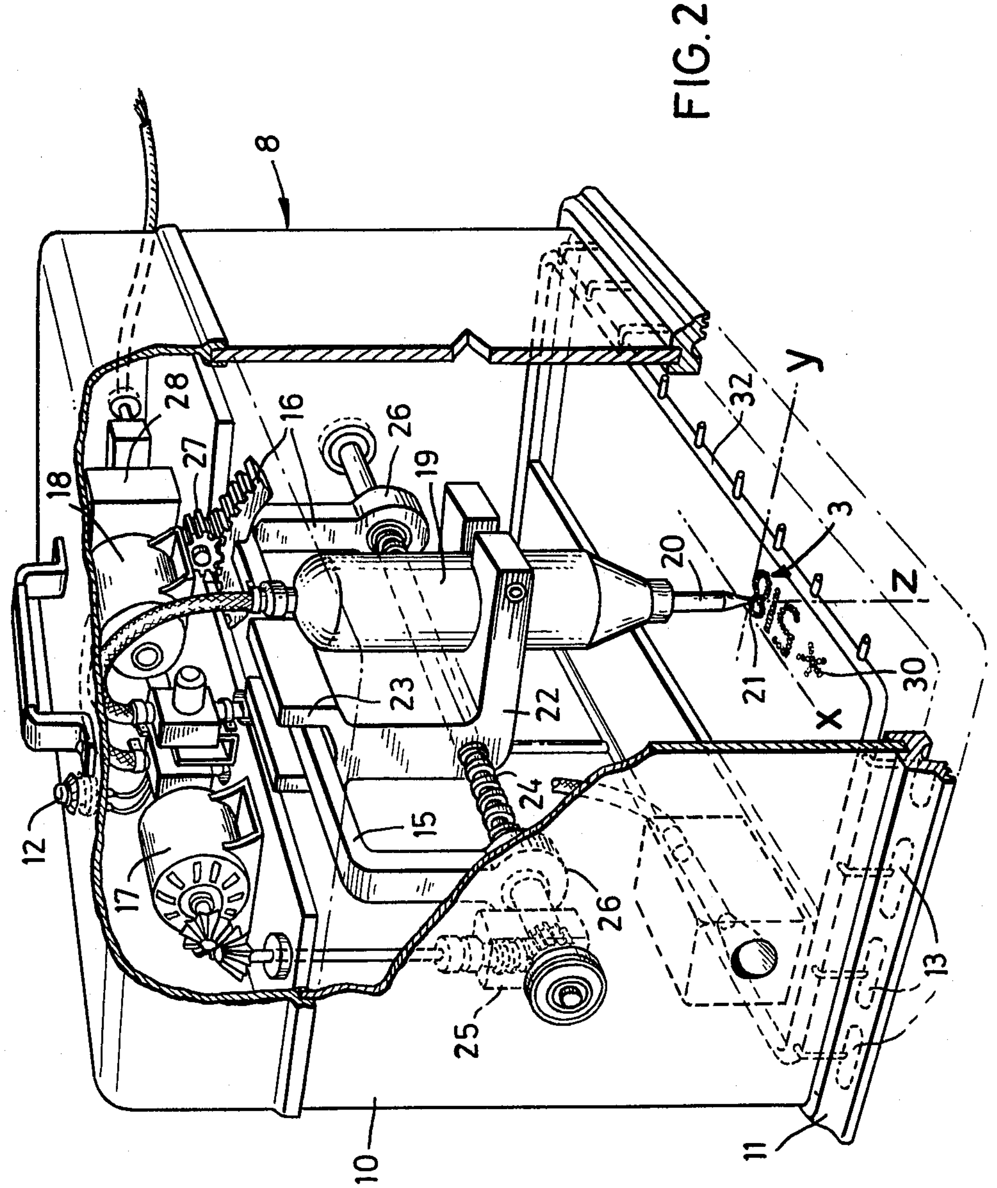
FIG. 2 is a perspective view with parts broken away for clarity of a novel marking or imprinting machine of this invention, and illustrates a vibrating tool which is mounted for motion along two paths generally normal or perpendicular to each other.

Motion is also imparted to the marking tool 19 in the Y-axis indicated in FIG. 2 by tilting the marking tool 19 about the axis of the worm spindle 24. The latter is achieved through a swivel mounting 15 of a generally inverted U-shaped construction in which a base or bight portion (unnumbered) of the U-shaped mounting 15 lies parallel to the worm spindle 24. Opposite downwardly directed arms (unnumbered) of the mounting 15 carry bearing 26 which journal the mounting 15 for rotation about the axis of the worm spindle 24 at unthreaded portions of the latter. At the end of the bight portion (unnumbered) furtherest to the right in FIG. 2 there is welded or otherwise secured a rack segment 16 at right angles to the bight portion and to the axis of the worm spindle 24. The rack segment 16 meshes with a pinion 27 which is driven by an electric motor 18 through a gear system 28. As the pinion 27 rotates the mounting 15 is swiveled about the axis of the worm spindle 24 so that the percussion tool support 22 is also similarly swiveled or pivotted. This in turn similarly swivels or pivots the percussion tool 19 about the axis of the worm spindle 24, but the impression of the characters formed during the vibration of a vibrating tip 20 having a point 21 remains of an approximately constant depth over their entire length.

The motion of the tip 20 is vibratory and lies in the plane of the Z-axis of FIG. 2 which is normal to the axes X and Y. The vibratory motion imparted to the tip element 20 limits the extent of motion in the Z-axis and thus the depth of the imprint can be varied by the amplitude of vibration of the element 20. The amplitude of the vibrating pin 20 is essentially determined by the distance of the surface to be printed and the depth of indentation is largely governed by this same distance.

In keeping with the invention thus far described it is also possible to secure the tool 19 to a slide which is caused to move parallel to the coordinates of a right angle coordinate system. This would, however, involve larger dimensions in the construction of the marking machine 8.

The marking machine 8 is secured to the structural component to be marked or imprinted by means of a vacuum heretofore noted, and in further keeping with this invention a suction pump or similar source is connected to the various compartments 13 by a ring-like suction tube 32 from which branch pipes (unnumbered) are connected to various ones of the compartments 13. However, in lieu of the resilient frame 11 and the individual compartments 13 thereof, individual suction cups may be secured to the periphery of the housing 8.

From the foregoing it is evident that the electric motor 17 controls the motion of the percussion or vibration tip 20 and the point 21 thereof in the X-direction while the electric motor 18 controls its motion in the Y-direction. The conversion of data into suitable coordinate motions, specifically motion in the X and Y-directions, employing an electronic calculator is well known and may be carried out with conventional programming methods.

The percussion tool 19 is also conventionally known and therefore details thereof is unnecessary. It need only be mentioned that the tip 21 of the element 20 vibrates in the longitudinal direction with reference to the axis of the element 19 and engages the surface of the structural component to be marked. At the completion of any single character the percussion element 20 is preferably halted in its uppermost or rest position with the point 21 spaced from the surface of the structural component being printed.

When the housing 10 has been affixed to the body 1 and/or the internal combustion engine block 2 and/or any other particular component, the computer 7 sets the percussion tool support 22 in motion along either the X or Y axis depending, of course, upon the "home" position of the tool 19. The support 22 and the tool 19 carried thereby is initially placed in its "home" or initial position by either or both of the motors 17 and 18. Upon the vibrating of the element 20 in a vertical direction and the guidance of the support 22 the element 20 and the tip 21 thereof follows the contours of the particular character or characters required. At the completion of each individual character or at any particular rest position the tip 21 is, of course, preferably in its upper rest position for shifting between adjacent characters or between portions of characters. There are obviously various possible methods of arranging the intervals between characters.

In such cases in which the structural components to be marked are made of ferrous metals the resilient frame 11 may be eliminated and in lieu thereof magnets may be employed or if the surface of the structural component to be inscribed is uneven the housing 10 of the percussion machine 8 may be provided with mechanical clamping members cooperative with edges or projections on such uneven structural components.

In the case of inscribing vehicle bodies and engine blocks a percussion element 20 is recommended which has a tip 21 with a conical angle of approximately 20° terminating in a spherical calotte of approximately D = 0.4mm. The percussion or marking device 19 may be a percussion riveter such as that marketed by Gardner, Denver called "Micro-riveter Type 43R - 1R". The percussion rate lies preferably between 6,000 and 9,000 percussions or vibrations per minute and the working stroke (amplitude) is preferably in the region of 12mm.

While preferred forms and arrangements of parts have been shown in illustrating the invention, it is to be clearly understood that various changes in detail and arrangement of parts may be made without departing from the spirit and scope of this disclosure.

I claim:

1. A marking machine comprising means for marking a desired character upon a surface of a structural component, said marking means including a marking tip, means for vibrating said marking tip a plurality of times against the surface of the structural component to deform the latter and form the desired character, said marking tip having a contact surface which contacts said structural component surface of a surface area appreciably smaller than the overall surface area of the desired character whereby a multiplicity of contacts of said marking tip surface against the structural component surface are necessary to form the desired character, first moving means for moving said marking tip along a first path contiguous the structural component surface, second means for moving said marking tip along a second path contiguous the structural component surface and generally normal to said first path, a generally closed portable housing within which is housed said marking means and said first and second marking tip moving means, said housing having an end adapted to be disposed contiguous the surface of the structural component to be marked, an opening in said housing end, and said marking tip being positioned adjacent said opening whereby to contact the structural component surface therethrough to form the desired character, and computor means responsive to input data for controlling the operation of said first and second moving means and selectively operating said vibrating means to impart sequential contacts of said marking tip against the surface of the structural component and thereby progressively contact-by-contact form the totality of the desired character.

2. The marking machine as defined in claim 1 including means for guiding said marking means during the movement thereof along said first path, and said second moving means pivotally moving said marking tip along said second path.

3. The marking machine as defined in claim 1 wherein one of said first and second paths is linear and arcuate.

4. The marking machine as defined in claim 1 wherein one of said first and second paths is linear and uniplanar, and the other of said first and second paths is linear and arcuate.

5. The marking machine is defined in claim 1 wherein said first moving means includes a rotatable threaded worm in threaded engagement with a threaded bore of a bracket carrying said marking tip.

6. The marking machine as defined in claim 1 wherein said second moving means includes a rotatable pinion in mesh with an arcuate rack, said rack being carried by a first bracket which in turn carries said marking tip, and means for pivotally mounting said first bracket about a predetermined axis whereby motion imparted to said arcuate rack by said pinion imparts arcuate motion to said marking tip along said second path.

7. The marking machine as defined in claim 1 wherein said first and second moving means include respective first and second brackets, and cooperative guide means between said brackets for guiding movement of said marking tip along both said first and second paths.

8. A marking machine comprising means for marking a desired character upon a surface of a structural component, said marking means including a marking tip, means for vibrating said marking tip against the surface of the structural component to deform the latter, said marking tip having a contact surface which contacts said structural component surface of a surface area appreciably smaller than the overall surface area of the desired character whereby a multiplicity of contacts of said marking tip surface against the structural component surface are necessary to form the desired character, first moving means for moving said marking tip along a first path contiguous the structural component surface, second means for moving said marking tip along a second path contiguous the structural component surface and generally normal to said first path, computor means responsive to input data for controlling the operation of said first and second moving means and selectively operating said vibrating means to impart sequential contacts of said marking tip against the surface of the structural component and thereby progressively contact-by-contact form the totality of the desired character, said first moving means includes a threaded worm rotatable about a first axis, a bracket having a threaded bore receiving said threaded worm, said marking tip being carried by said bracket whereby upon rotation of said threaded worm said marking tip moves along said first path, said second moving means includes a rotatable pinion in mesh with an arcuate rack, said arcuate rack being carried by a second bracket, means mounting said second bracket for pivoting movement about said first axis, and means coupling said first and second brackets to each other whereby upon rotation of said pinion said first and second brackets are pivoted and impart arcuate motion to said marking tip along said second path.

9. The marking machine as defined in claim 8 wherein said coupling means is a linear sliding connection between said first and second brackets whereby upon the rotation of said threaded worm said first bracket and the marking tip carried thereby is moved linearly along said first path under the guidance of said coupling means.

10. The marking machine as defined in claim 8 wherein said second bracket is pivotally mounted upon an unthreaded portion of said threaded worm.

11. The marking machine as defined in claim 8 wherein said first bracket is of an L-shaped configuration defined by a pair of legs, a first leg of said L-shaped bracket carries said marking tip, said second bracket carries said marking tip, said second bracket is of an inverted U-shaped configuration defined by a bight portion and a pair of legs, said U-shaped bracket legs are pivotally mounted upon unthreaded portions of said threaded worm, and said coupling means is a linear sliding connection between a second leg of said L-shaped bracket and the bight portion of said inverted U-shaped bracket.

12. The marking machine as defined in claim 11 wherein said second leg of said L-shaped bracket includes a guide slot forming a portion of said coupling means and slidably receives therein said inverted U-shaped bracket bight portion.

* * * * *